(12) United States Patent
Bisdikian et al.

(10) Patent No.: US 8,660,022 B2
(45) Date of Patent: Feb. 25, 2014

(54) ADAPTIVE REMOTE DECISION MAKING UNDER QUALITY OF INFORMATION REQUIREMENTS

(75) Inventors: Chatschik Bisdikian, Yorktown Heights, NY (US); Ting He, Yorktown Heights, NY (US); Murtaza Zafer, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 785 days.

(21) Appl. No.: 12/619,121

(22) Filed: Nov. 16, 2009

(65) Prior Publication Data

US 2011/0119523 A1 May 19, 2011

(51) Int. Cl.
*H04L 12/26* (2006.01)
(52) U.S. Cl.
USPC ............ 370/252; 370/255; 370/311; 370/401
(58) Field of Classification Search
USPC .................. 370/252, 255, 311, 400, 401, 402
See application file for complete search history.

(56) References Cited

U.S. PATENT DOCUMENTS

| | | | | |
|---|---|---|---|---|
| 6,405,256 | B1 * | 6/2002 | Lin et al. | 709/231 |
| 6,862,618 | B1 | 3/2005 | Gray | |
| 7,302,362 | B2 * | 11/2007 | Misra et al. | 702/182 |
| 7,346,527 | B2 | 3/2008 | McKay | |
| 2004/0138867 | A1 * | 7/2004 | Simkins | 703/22 |
| 2006/0271661 | A1 * | 11/2006 | Qi et al. | 709/223 |
| 2007/0036087 | A1 * | 2/2007 | Kangru | 370/252 |
| 2008/0052041 | A1 | 2/2008 | Misra | |
| 2008/0195440 | A1 | 8/2008 | Bagchi | |
| 2008/0208367 | A1 | 8/2008 | Koehler | |
| 2008/0209026 | A1 | 8/2008 | Qi | |

FOREIGN PATENT DOCUMENTS

EP 1039691 A1 9/2000

OTHER PUBLICATIONS

Prasanth, et al., "Quality of Information Measures for Autonomous Decision-Making," 2nd AIAA "Unmanned Unlimited" Systems, Technologies, and Operations—Aerospace Sep. 15-18, 2003, San Diego, California.
Zahedi, Sadaf, and Bisdikian, Chatschik, "A Framework for QoI-Inspired Analysis for Sensor Network Deployment Planning.".

* cited by examiner

*Primary Examiner* — Alvin Zhu
(74) *Attorney, Agent, or Firm* — Michael J. Buchenhorner (57) ABSTRACT

A system and method for adaptive remote decision making includes steps of: receiving from an application layer a target range for a level of reporting quality for processed data; setting data collection parameters to meet the target range; collecting the data from a plurality of remote data collecting devices deployed in the distributed computing system, a portion of said data being compromised during the collecting process; processing the collected data to produce the processed data; evaluating the processed data based on observable metrics of current collected data and reported data losses; forecasting an expected reporting quality while continuing to collect the data; comparing the expected reporting quality with the target range; and reporting the processed data when the expected reporting quality falls within the target range for the level of reporting quality.

19 Claims, 5 Drawing Sheets

```
┌─────────────────────────────────────┐
│ Application Layer announces an      │
│ expected reporting quality to the   │
│ Fusion Center.                      │
│              210                    │
└─────────────────────────────────────┘
                 ⇓
┌─────────────────────────────────────┐
│ The Fusion Center configures        │
│ parameters of the data collecting   │
│ and sends to Collecting Agents.     │
│              220                    │
└─────────────────────────────────────┘
                 ⇓
┌─────────────────────────────────────┐
│ The Collecting Agents gather data   │
│ based on pre-set config parms and   │
│ forward to Fusion Center.           │
│              230                    │
└─────────────────────────────────────┘
                 ⇓
┌─────────────────────────────────────┐
│ The Fusion Center receives the      │
│ collected data                      │
│              240                    │
└─────────────────────────────────────┘
                 ⇓
┌─────────────────────────────────────┐
│ The Fusion Center evaluates the     │
│ sample data.                        │
│              250                    │
└─────────────────────────────────────┘
                 ⇓
┌─────────────────────────────────────┐
│ The Fusion Center adjusts its data  │
│ collecting process to meet the      │
│ expected QoI.                       │
│              260                    │
└─────────────────────────────────────┘
                 ⇓
┌─────────────────────────────────────┐
│ The Fusion Center reports the       │
│ results.                            │
│              270                    │
└─────────────────────────────────────┘
```

ADAPTIVE REMOTE DECISION MAKING UNDER QUALITY OF INFORMATION REQUIREMENTS

STATEMENT REGARDING FEDERALLY SPONSORED-RESEARCH OR DEVELOPMENT

The invention described herein was funded in part by a grant from the United States Army, Contract No. W911NF-06-3-0001. The United States Government may have certain rights under the invention.

CROSS-REFERENCE TO RELATED APPLICATIONS

None.

INCORPORATION BY REFERENCE OF MATERIAL SUBMITTED ON A COMPACT DISC

None.

FIELD OF THE INVENTION

The invention disclosed broadly relates to the field of remote decision making and more particularly relates to the field of adaptive remote decision making based on information collected by monitoring software agents in distributed computing systems.

BACKGROUND OF THE INVENTION

Sensor networks are widely used for monitoring and surveillance. Multiple sensors are positioned so as to collect raw environmental data which is then processed for monitoring and decision-making Sensor networks endeavor to provide accurate and timely detection of signals and events that occur in an external environment. The signals may be transient, periodic or a combination thereof. The transitory nature of the signals exacerbates problems with detecting the signals. For example, collecting samples from distributed sensors to detect the presence of a signal in additive white Gaussian noise (AWGN) can be unreliable because of the presence of noise and also because some of the samples may be lost. In general, for any information gathering and detection system, missing and noisy samples lead to performance degradation because the information contained in these samples is either degraded or lost.

In cases where sensors are deployed to detect certain transient events, or other sudden changes in the environment, and report these events to a fusion center, the sensors report the samples to the fusion center through erasure channels where some of the samples are lost. Missing samples can be caused by fading, interference, network congestion, and other factors. Because of the noisy nature of the measurements it is not possible to determine the value of the missing samples and hence such samples cannot be recovered.

A key to preventing performance degradation in such a distributed decision making system is to recover the lost information, such as the lost signal energy, in missing samples. One solution to this problem is to compensate for the possibility of missing samples by operating the system under fixed oversampling which results in an increased sample size. This solution, however, is inefficient and wasteful in terms of system resources and tends to overburden the network, causing congestion.

Error correction coding is commonly used in wireless communications to reduce the effect of noise on samples by utilizing coding to recover the original samples from the received noisy versions. However, this method does not completely eliminate the occurrence of missing samples and it introduces additional complexity at the sensor level. Moreover, both of the above methods fail to take into consideration the difference between samples. For example, in the detection of transient signals, the detection performance depends not only on how many samples are missing, but also on which samples are missing.

Remote decision making is an important aspect within many monitoring/information gathering systems, such as sensor networks. Any uncertainty/losses in the collected data deteriorate the Quality of Information (QoI) that can be derived from the collected data. A major concern in such systems is loss of data and/or its quality that occur between the information gathering end-point and the fusion center, e.g., due to imperfections of the communication links and the communication nodes along the path between the two end-points.

In general, since data processing/aggregation must be done in a timely manner, loss of data affects the QoI presented to the application layer by the fusion center. As a result the derived QoI may be lower than the levels prescribed by the higher applications. Known methods address this problem in a separated approach. The system is first partitioned into layers, consisting of information collection, reporting, and processing, and then modularized solutions are developed to improve the function of each layer.

Such a separated approach sacrifices performance for simplicity, and for complex systems, it often fails to provide any ultimate QoI guarantee for the supported applications. Another drawback of the layered approach is that it ignores the active interactions between layers, especially the possibility that the processing module can provide feedback to information collection and reporting modules to improve the overall QoI.

Therefore there is a need for an information gathering system to overcome the above-described shortcomings.

SUMMARY OF THE INVENTION

Briefly, according to an embodiment of the invention a method uses an information fusion device as part of a distributed computing system for executing steps or acts of: receiving from an application layer a target range for a level of reporting quality for processed data; setting data collection parameters to meet the target range; collecting the data from a plurality of remote data collecting devices deployed in the distributed computing system with an assumption that some of the data is compromised during the collecting process; processing the collected data to produce the processed data; evaluating the processed data based on observable metrics of current collected data and reported data losses; forecasting an expected reporting quality while continuing to collect data; comparing the expected reporting quality with the target range; and reporting the processed data when the expected reporting quality falls within the target range for the level of reporting quality.

The method further includes dynamically adjusting the collecting and/or the processing when the estimated reporting quality falls below the target range. The adjusting process may include: adjusting a timeframe for data collection, adjusting a rate of the data collection, adjusting a precision of the data collection, shifting to a different collection process, adjusting a size of the cluster of data collecting nodes, adjusting a granularity of the data, and shifting to a different aggregation operator.

According to another embodiment of the present invention, a distributed computing system for remote adaptive decision making includes: a plurality of remote data collecting devices, and a fusion device operatively coupled with at least some of the plurality of the remote data collecting devices and configured to execute the method steps. The data may be categorized into multiple classes, wherein each class has a different target range and/or uses different data collecting devices and processes. The remote data collecting devices may be grouped in clusters, with one node in the cluster operatively coupled with the fusion device.

According to another embodiment of the present invention, a computer readable storage medium includes program code that, when executed, performs the method steps as previously set forth. The method can also be implemented as machine executable instructions executed by a programmable information processing system or as hard coded logic in a specialized computing apparatus such as an application-specific integrated circuit (ASIC).

BRIEF DESCRIPTION OF THE DRAWINGS

To describe the foregoing and other exemplary purposes, aspects, and advantages, we use the following detailed description of an exemplary embodiment of the invention with reference to the drawings, in which.

While the invention as claimed can be modified into alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the present invention.

DETAILED DESCRIPTION

In the following description, numerous specific details are set forth by way of exemplary embodiments in order to provide a more thorough description of the present invention. It will be apparent, however, to one skilled in the art, that the present invention may be practiced without these specific details. In other instances, well-known features have not been described in detail so as not to obscure the invention. The preferred embodiments of the inventions are described herein in the Detailed Description, Figures and Claims. Unless specifically noted, it is intended that the words and phrases in the specification and claims be given the ordinary and accustomed meaning as understood by those of skill in the applicable art. If any other meaning is intended, the specification will specifically state that a special meaning is being applied to a word or phrase.

An information gathering system is one that consists of a set of end-points that collect information (or data) from the external environment, and report this data to a set of fusion centers for aggregation and decision making. A fusion center is a middle layer between the disparate information sources and the user application. It provides an interface for the user application to specify system-wide queries together with their Quality of Information (QoI) expectations, coordinates the sources and intermediate layers to produce responses that satisfy the QoI expectations, and responds to the user application. A fusion center could be part of the end-point device and/or an external device which collects information from multiple end-points. The data collected, which may be corrupted with noise, is aggregated at the fusion center in a timely manner to be reported to the higher application layer with some fidelity and information quality.

We describe a solution for the above-described shortcomings in information gathering and processing systems by presenting a method for the control and management of distributed computing systems that collect data using software agents possibly coupled to physical sensors. The data thus collected is processed (aggregated) at a fusion center to produce a meaningful summary of the data upon which the distributed computing system will act. For example, in a field monitoring system, acoustic signals measure sound intensity and the data collected from these sensors is aggregated and compared against a signal-of-interest due to an event (such as an intrusion or a passing vehicle) to infer the presence or absence of that event over the measurement window interval. Based on this inference, the user application accordingly activates a response to that event. Another example is a building environmental control system, where data collected from temperature sensors (temperature measurements) are averaged out per a measurement window interval and a building zone, and heat/AC/etc./is activated accordingly.

We will enumerate and describe the following six features of the present invention that provide the benefits and advantages of the adaptive decision-making method:

1) Dynamic adaptation;
2) Closed loop control;
3) Three tier architecture;
4) Periodic and non-periodic raw data;
5) Parallel simulation; and
6) Cost.

1) Dynamic Adaptation.

The method according to an embodiment of the present invention is centered around an adaptive policy that mitigates the effect of missing/degraded measurement samples by dynamically adjusting its sampling/data-gathering procedures in order to balance the QoI of aggregated information reported to the user application and detection performance, with the cost of adaptation. Compared with the traditional approach where the data gathering and aggregation process is independent of the user layer applications, this approach is based on cross-layer optimization in support of signal/event detection, reflecting the application-specific characteristic of the system.

Using adaptive data gathering mechanisms, the collected samples (or a subset of the collected samples) are used to guide future samplings and this adaptation is done in response to the QoI of the aggregated data that will be produced, while taking into consideration the cost constraints. After each missing sample (or a threshold range of missing samples), the fusion center adjusts the data collection parameters at the software agents so as to achieve the same QoI of the final aggregated data and the same detection performance as before with a minimum increase in sampling rate. For example, by using a maximum sampling rate constraint, we increase the proposed sampling rate uniformly by tuning a control parameter to achieve a desired robustness, measured by the probability that the fusion center receives sufficient signal energy to satisfy given error bounds.

The method uses dynamic adaptation of known data collecting processes. This adaptation may include, inter alia, switching to different methods of data collection (for example: instead of collecting raw data from acoustic sensors, the Fusion center may decide to collect raw data from radio frequency (RF) sensors, which is a switching of the data collection mechanism). Other examples of adaptation include adjusting the data collection rate, data precision, adjusting an observation window over the time and space over which data will be collected, adjusting the methods of data fusion (e.g., changing granularity, changing the aggregation operator, and so forth).

2) Closed Loop Control.

One of the key aspects of the method is to provide a closed loop control between the target QoI mandated by the Application layer and the aggregated data as reported by the fusion center within the data gathering process. The data collected from remote end-points is aggregated at the fusion center, and the aggregated data is reported to a higher application layer in a timely manner. Any adjustments to the sampling and data collection mechanisms which are deemed necessary to fulfill the expected QoI are made by the fusion center.

3) Three Tier Architecture.

The system for implementing adaptive monitoring and decision-making encompasses a three-tier architecture consisting of an "Application layer," "Fusion layer," and "Data collection layer." This layering must be viewed in terms of functionality and not in terms of physical separation, since one physical device can implement these multiple functions. The Application layer determines the QoI (quality of information) that it needs for the data reported to it by the Fusion layer. The Fusion-layer monitors this QoI for the current processes of data collection/fusion and adjusts these processes dynamically to meet the target QoI. The Data-collection layer is the lowest layer that generates the raw data. The adaptive remote decision making is carried out under quality of information requirements configured for quality of information expectations.

In the distributed monitoring/management three-tier architecture as discussed, information is collected from remote agents (monitoring entities such as sensors). The monitoring system aggregates/processes the collected data and reports results (as information) to upper layer applications. The system operates under the assumption that some of the data to be collected may be noisy, lost/missing and/or with degraded quality.

4) Periodic and Non-periodic Raw Data.

The method is applicable to both periodic and non-periodic raw data. Periodic data is data that is collected, fused and reported to the Application layer periodically at certain time intervals. The non-periodic data (which includes transient signals) are usually aggregated and reported in single instances. The data collection layer of the three-layer system and the corresponding method can be implemented for sampling of many different types of raw data, including, inter alia, transient, persistent, periodic, waveforms, system status levels and events, e.g., buffer occupancy, environmental data, and so forth.

5) Parallel Simulation Environment.

The information collection parameters themselves can be tested by running a simulation environment parallel to the actual running system to test the QoI under adjusted information collection settings offline before applying the parameters to the actual system. This prevents oscillation in the system caused by frequent adjustments.

6) Cost.

Adjusting the data gathering parameters carries a cost; therefore, we take into consideration the cost of adjusting the data collection and aggregation parameters. Examples of such costs can include, but are not limited to, the cost of computing the adjusted parameters for information collection and processing, the costs of switching to a different type of data collecting node, and the cost of increasing/adjusting the data collecting nodes.

The cost value can also include the cost incurred during the adjustment phase, including, among others, the cost of communicating the adjusted parameters to the remote information-collecting nodes, the cost of applying the adjustment to the data collecting nodes, and the cost of re-setting the system back to its original parameters at the end of the observation window. The cost value can also include the cost incurred under the new settings due to the adjustment, which can include, among others, the additional cost of data collecting and processing under the new configuration parameters. The focus remains on satisfying the QoI mandate and as such, it may not be possible to meet all cost constraints. In that event, we provide the operational conditions/adjustments that provide as low a cost as possible.

Figure 1:
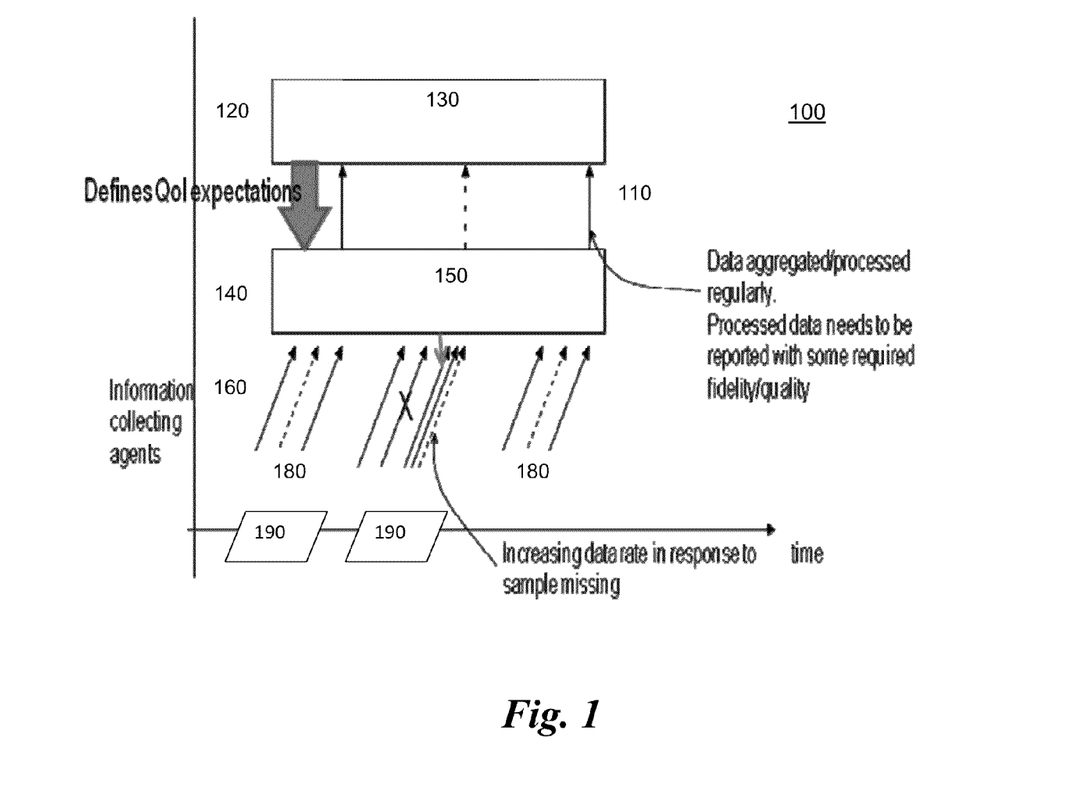
FIG. 1 is a simplified block diagram of a system configured to operate, according to an embodiment of the present invention.

Referring now to the drawings in general and to FIG. 1 in particular, we illustrate the multi-layered QoI system 100 for adaptive remote decision making. In this exemplary embodiment, we introduce the three layers: the Application layer 120, the Fusion Center Layer 140, and the Data Collecting Layer 160.

The Application Layer 120 includes the Applications component 130 and the main role of this component is to announce a reporting quality (QoI expectations) for the information to be reported to it by the fusion center layer 140. The Applications component 130 may include computerized habitat and environmental control systems, intrusion detection systems, field event monitoring systems, computing system operating monitoring systems, and any other sensor-enabled event monitoring and detection systems.

The Fusion Center Layer 140 includes at least one Fusion Center 150 that collects the data 190 transmitted from the remote endpoints 180. At each reporting instant between the Fusion Center 150 and the Application Layer 120, the fidelity of the aggregated/fused data/information 110 depends on the quality of data obtained from the information gathering agents 180. As the Fusion Center 150 collects the data 190, it evaluates/estimates the expected reporting quality (QoI) of the aggregated data 110 at the reporting instant to the Application Layer 120, where the reporting instant could be at a future point in time.

Based on this estimation of QoI from the current data gathering and fusion process and in comparison to the previously announced QoI expectations by the Application Layer 120, the Fusion Center 150 then dynamically adapts the configuration parameters of the data gathering process to achieve the target quality level (QoI) of the aggregated/reported data 110. The adaptation may take the form of adjusting the rate of information collection, the precision of information collection, or shifting to a different means of collection, among others.

Examples of shifting to a different means of data collection include changing the parameters and/or the system processes of the data collecting endpoints 180, shifting to a different set of data collecting endpoints 180, shifting to a different form of data collection, among others. The adaptation can be made online or offline.

We assume that the connections between the Fusion Center 150 and the agents 180 are potentially unreliable. The Fusion Center 150 collects all of the remote (field) data 190 with the assumption that some of the data 190 may be noisy, lost, missing, distorted, with degraded quality, or otherwise compromised during the data gathering process.

The Data Collecting Layer 160.

The Data Collecting Layer 160 includes a plurality of endpoints 180 that gather data 190 and transmit it to the Fusion Center 150. In the presence of data losses and other distortions, the aggregated data 110 loses its fidelity and may not have the expected quality of information. We assume that the data gathering agents 180 have a potentially noisy data gathering process. An example of a data gathering agent is a sensor. In some cases, the signals transmitted by the sensors are transient signals, meaning that they last for only a short period of time. Some examples of transient signals are: seismic signals, acoustic signals from a moving object, RF signals from an intrusion, and Doppler signals.

Sensor networks are widely used for monitoring and surveillance. Multiple sensors are positioned so as to collect environmental data and provide this data in the form of signal samples. Sensor networks endeavor to provide accurate and timely data collection from an external environment. The data that is collected may be physical measurement data, system characteristics, topographical data, biometric data, and so forth. The physical measurement data can take the form of acoustic data, radio-frequency signals, and so on. The system characteristics can take the form of low-level data, system logs, and others which are subject to noise and errors. The collected data may introduce a distortion into the QoI of data reported by the Fusion Center 150 to the Application components 130.

The collected data may be categorized into classes and these classes may have different data gathering requirements. Moreover, each class may have its own and possibly different quality range, data-collecting nodes and evaluation and/or adjusting methods.

Data collecting problems are heightened when dealing with data in the form of transient signals and when there is a fixed time window of measurement collection before reporting the aggregated result. The transitory nature of the signals exacerbates problems with collecting the signals. For example, collecting samples from distributed sensors to detect the presence of a signal in additive white Gaussian noise (AWGN) can be unreliable because some of the samples may be lost. Missing samples can cause performance degradation by reducing the signal energy received.

Suppose sensors are deployed to detect certain transient events, or other sudden changes in the environment, and report these events to the Fusion Center 150. The sensors report the samples to the Fusion Center 150 through erasure channels where some of the samples are lost. Missing samples can be caused by fading, interference, network congestion, and other factors. Because of the transient nature of the signals, data provided from transient signals differs in significance depending on when the samples are taken.

When the Application Layer 120 determines its QoI requirements it must take into consideration the application that will be processing the processed (aggregated) data 110 reported by the Fusion Center 150 and not on the underlying sensor data 190. Some of the types of QoI requirements are: a pre-specified confidence level of accuracy of detecting an event (or multiple events); and a pre-specified confidence level of detecting an event within a certain time frame. Generally, a threshold level is set and the processed data must fall within the threshold.

Figure 2:
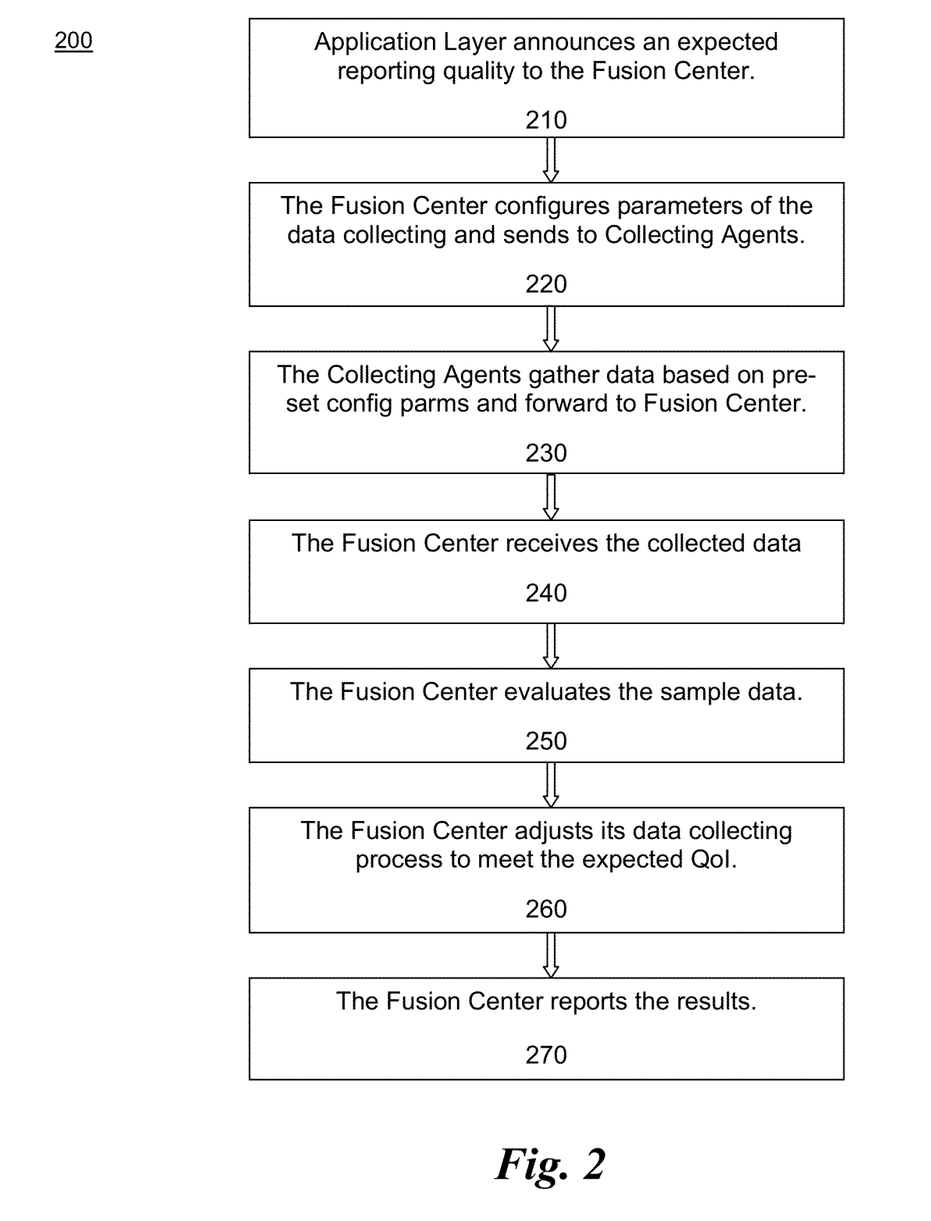
FIG. 2 is a high level flowchart of a method for adaptive remote decision making, according to an embodiment of the invention.

Referring now to FIG. 2, there is shown a high level flowchart 200 of the closed loop control method according to an embodiment of the present invention. The process begins with specifying how the detection system is to be evaluated. The evaluation is based on two objectives: 1) increasing detection performance; and 2) minimizing operation cost. In order to evaluate detection performance, we focus on the following performance measures:

a) accuracy, measured by the false alarm probability and the miss probability of detecting an event;

b) timeliness, measured by the detection delay, i.e., the elapsed time before a decision is made and the event occurrence; and c) robustness, measured by the probability of achieving a given accuracy.

Both accuracy and timeliness are objective measures. In this scenario, robustness is a subjective measure of the extent to which the adaptive policy can recover the loss of information caused by missing samples. The sample loss manifests itself in increased error probabilities and/or larger delays. With regard to operational cost for this exemplary embodiment, we focus on the communication cost of the sensors, based on the average sampling rate and the sample size.

Referring again to FIG. 2, the process begins at step 210 when the Application Layer component 130 announces a target reporting quality (QoI) of the aggregated data 110 to the Fusion Center 150. The formula for calculating the QoI of the aggregated data 110 depends on the underlying application and what aspects are important for assessing the quality of information. By way of example, for Newman-Pearson hypothesis testing, formulas for the probabilities of detection and false alarm can be used. The reporting quality may consist of different subsets of reporting quality for each of the different classes of data. Other examples of QoI include accuracy, timeliness, and so forth.

In step 220 the Fusion Center 150 receives the target reporting quality and based on this target, configures the parameters of the information collection to meet this requirement and sends these parameters to the data collecting agents 180. These parameters may represent, inter alia, type of sensor, sampling rate, sampling window, granularity, and precision.

Next in step 230 the data collecting agents 180 gather data based on the pre-set configuration parameters and forward the data to the Fusion Center 150. As the data 190 is collected (shown as slanted arrows in FIG. 1), the system 100 suffers data losses and other distortions because the data that is collected is subject to various imperfections such as missing data and errors including noise. These data losses are shown in the middle stage of FIG. 1 with an "X" in the figure. It is important to note that the data gathering nodes can be clusters of nodes, rather than just individual nodes.

Occurring in real-time at step 240 the Fusion Center 150 collects the data 190 transmitted by the agents 180 and aggregates the data in order to estimate the anticipated quality of information that will be reported based on the observable metrics in the collected samples of measurements, taking into consideration the errors. As part of this process, the Fusion Center 150 utilizes the time frame of data aggregation and/or statistical knowledge of the loss process of the collected data 190 for predicting the anticipated quality of information that will be reported by the Fusion Center 150 at the reporting instants.

In step 250 the Fusion Center evaluates the QoI of the aggregated information 110 that it will report based on the current data collection and the losses encountered/expected until the reporting instant. While the Fusion Center 150 continues to gather the data 190 in real-time it forecasts an expected QoI that the processed data/information 110 would possess if the Fusion Center 150 continues collecting data under the present parameters.

The forecasting can be done by generating a statistical model of the collected data 190, the data losses/distortions, and/or a statistical model of the calculated metric, such as by feeding the computed quality measure based on the current sampling and the time remaining until the expected reporting instant into a depreciation formula.

Evaluating the QoI of the processed/aggregated data 110 may involve calculating the reporting quality metrics based on observable metrics in the collected data 190. The evaluation can be done through a model-based approach using pre-calculated formulas for QoI, or it can be performed by simulating, using a computer, the reporting quality by feeding the collected data 190 into a model of the corresponding decision-making module in the Application Layer 120 in an offline simulation environment.

The Fusion Center 150 is able to compute in real-time the QoI that would be delivered at the reporting instant based on the current data collection processes and samples received. The expected reporting quality of information based on the data collection process is compared with the target reporting quality announced by the Application Layer component 130 in step 210.

In step 260, if necessary based on the deviation between the expected QoI and the target QoI, corrective control actions are taken to achieve the desired QoI by dynamically adjusting the data collection process so that the quality of aggregated/processed data reported finally by the Fusion Center 150 meets the desired value, with respect to the cost involved.

In FIG. 1 this adaptation is shown as an increased sampling, for exemplary purposes. The adaptation is done dynamically. The adaptation may be initiated by the Fusion Center 150 or triggered by (i) user interaction; (ii) missing information; (iii) content of fused information; or (iv) any other changes in QoI. For example, an observed decrease in the accuracy or the robustness of the processed data at the current or forecasted time instant would trigger an adaptation. The adaptation may also consider the cost (energy, bandwidth), such as cost incurred both during and after the adjustment of the data collection process; and the tradeoff between the QoI improvement and the cost. Note that the Fusion Center 150 and/or the Application layer 120 may set an acceptable threshold value within which the QoI of the reported data may deviate from the target QoI.

Figure 3:
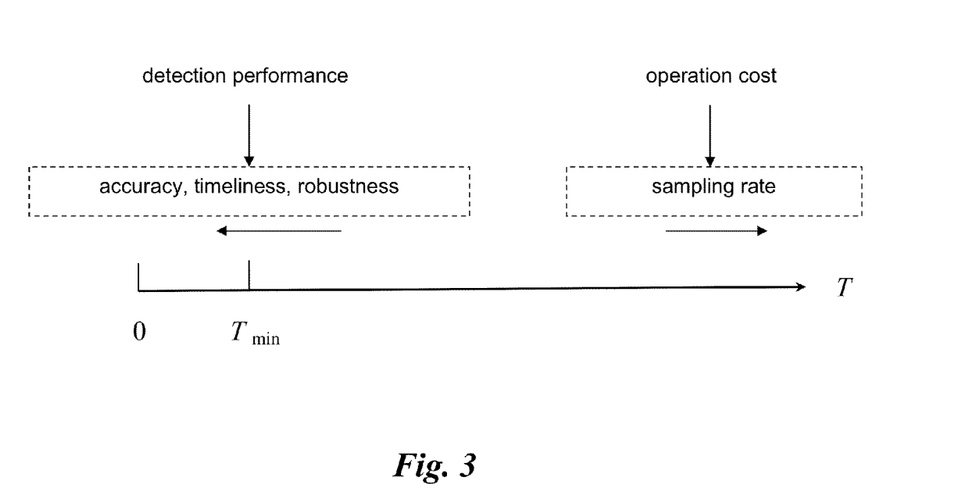
FIG. 3 shows how the performance criteria influence the selection of a sampling period, according to an embodiment of the present invention.

With reference now to FIG. 3, we show a particular adaptation that involves changing the sampling period T of the sensors 180 collecting the data 190. This example serves to illustrate the influence on the various performance criteria based on the selection of the sampling period T. $T_{min}$ is the minimum sampling period supported by the sensor 180. Reducing the sampling period increases the sampling rate and, hence, increases the number of samples collected which results in a higher QoI of aggregated data (improves accuracy, timeliness and robustness).

The drawback is that it leads to a higher data-collection cost as more energy is spent in sampling and communicating the raw data to the fusion center 150. On the other hand, decreasing the sampling period leads to lower operational cost but causes performance degradation. FIG. 3 thus shows that minimizing the sampling rate T leads to a tradeoff between detection performance and resource consumption.

Figure 4:
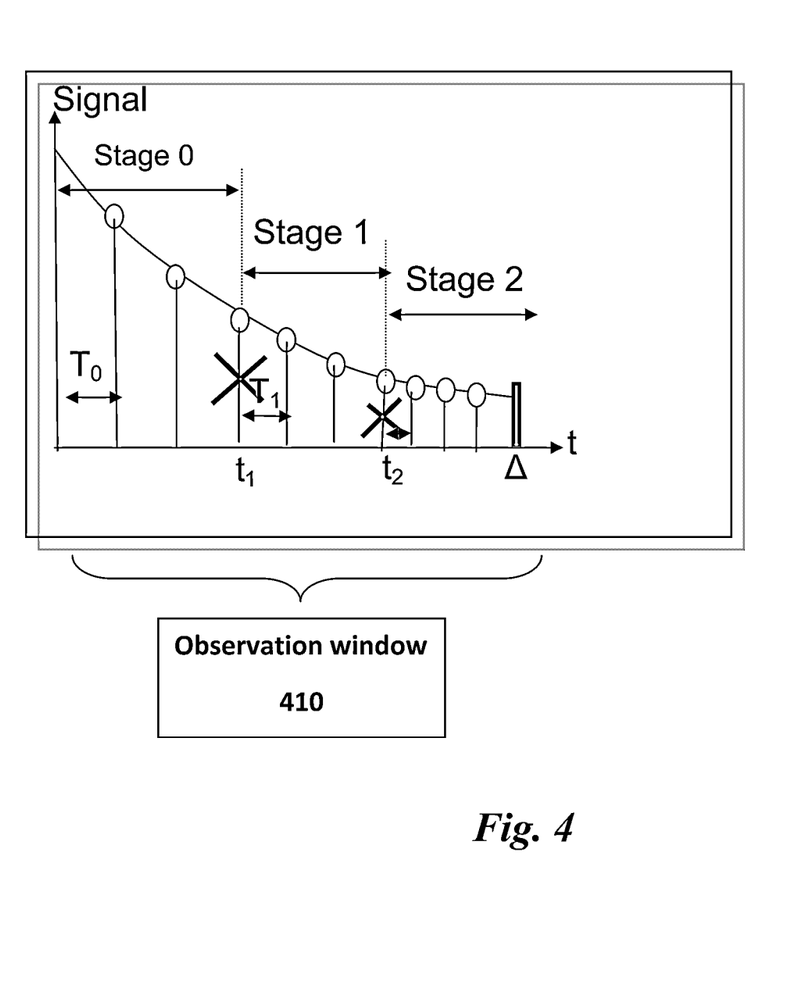
FIG. 4 shows the adaptation procedure partitioned into stages, according to an embodiment of the present invention.

In FIG. 4, we outline an example mechanism of how adaptive data-collection and sampling can be realized. Suppose that a data-collecting agent is configured with initial parameters to collect raw data such that without any sample misses the target QoI of aggregation, performed by the Fusion Center 150, is achieved. During system operation, let $t_i$ be the timestamp of the ith missing sample.

Since this sample is lost and not received by the Fusion Center 150, the QoI of the reported (aggregated) data will be reduced. By calculating the reduction in the QoI in real-time, the Fusion Center 150 initiates an adjustment of the sampling period to compensate for the lost sample while still achieving the target QoI for the (future) reporting instant. In the example case, the Fusion Center 150 decreases the sampling period, $T_i$, from that instant onwards, so that the data collecting agent 180 collects raw data at smaller time intervals (or at faster rate), and this process is repeated at every missing sample, leading to a multi-stage adaptation of the sampling period over the observation window 410.

An observation window 410 is incorporated into the sampling method to confine the sampling within a temporal space and to provide aggregated information in a timely manner. An observation window 410 is the time duration during which the sensor data 190 is collected and combined by the Fusion Center 150. At the end of this window (or anytime after) the Fusion Center 150 reports the processed data 110 based on the data collected from the Collecting agents 180 during the observation window 410. The window 410 has relevance to the QoI and must be appropriately selected. For example, choosing a small observation window produces less collected data 190 which can result in a lower QoI of the fusion/decision-making process, while a larger window can delay reporting of the processed data 110 and/or decision-making Note that the observation window 410 is not limited to a predefined or fixed-length window of time. The observation window 410 may be more useful as a flexible window. For example, assuming the QoI requirement is limited to accuracy, the observation window may be the collecting period during which the agents 180 collect raw data until the target QoI is met.

The observation window 410 potentially contains an event of interest and can be fixed a priori or can be dynamically adjusted in real-time. Possible events of interest include detecting a particular signal activity in a physical measurement based system, detecting a target and/or observing abnormalities in the field in which the sensors 180 are deployed. The steps 240, 250 and 260 of the flowchart are the dynamic adaptation steps and may be repeated many times over the observation window 410, as more data samples are collected and losses, distortions and missing samples are observed.

Lastly, in step 270 the Fusion Center 150 reports its processed data results to the Application Layer 120. In FIG. 1 this is shown as the upward arrows between the Fusion Center 150 and the Application Layer 120.

In order to prevent the adjustment from disrupting the process, it may in some instances be preferable to first apply the adjustment actions to a parallel system running in a simulation environment before the adjustment is applied to the actual system. Both the initial adjustment and the subsequent iterations of information collection, fusion, evaluation, and re-adjustment are performed off-line in a parallel simulated system until the resulting reporting quality falls within the expected range, after which the final adjustment is applied to the actual system.

The adaptation or adjustment can take many forms, just a few of which are: a) adjusting the observation window timeframe; b) adjusting the number of data-gathering nodes 180; c) adjusting the granularity of the data 190 to be collected; and d) shifting to a different aggregation operator. An aggregation operator is a function used by the Fusion Center 150 to process (aggregate) the collected data 190 so that it provides meaningful information. As an example, to detect the presence of a signal embedded in background noise, an operator may include projecting the collected data 190 onto the direction of the signal over the observation window and comparing the result with a threshold to give a binary output indicating whether the signal is present or not.

Figure 5:
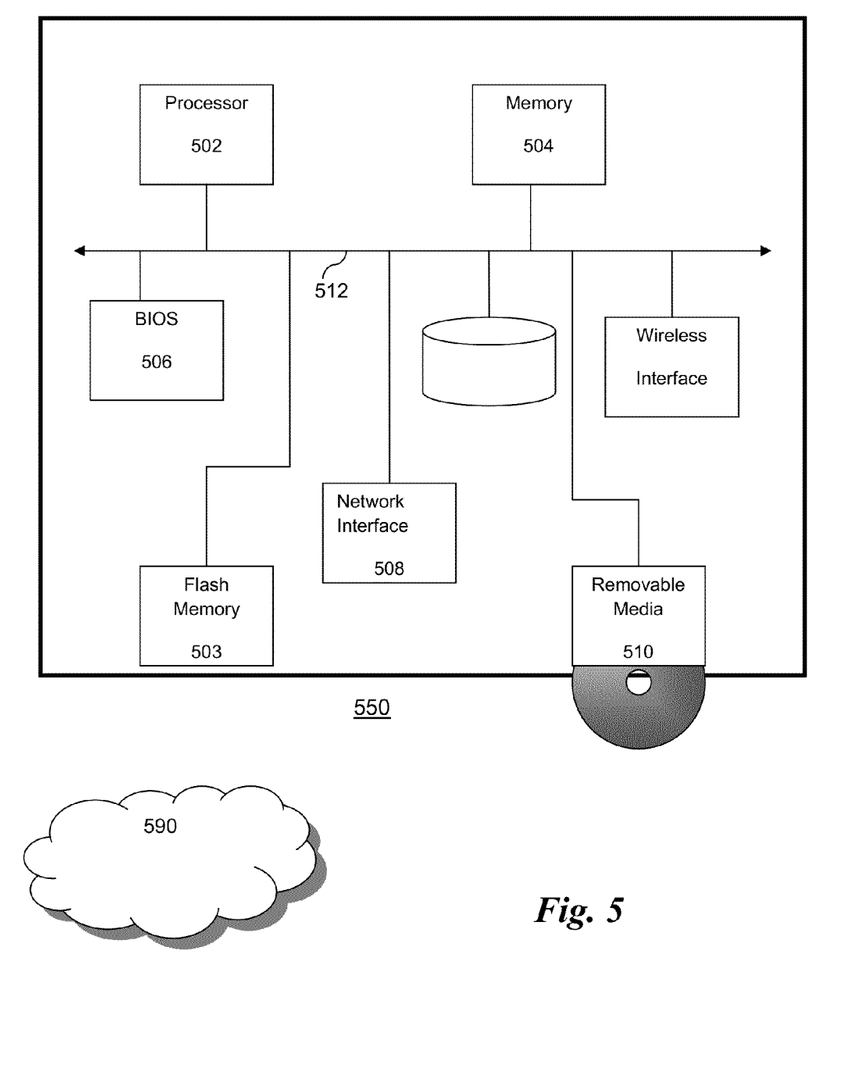
FIG. 5 is a simplified block diagram of a fusion center, according to an embodiment of the invention.

Referring to FIG. 5, we show an exemplary Fusion Center 550. Here Fusion Center 550 is illustrated for exemplary purposes as a networked computing device, in communication with other networked computing devices (not shown) via a network, such as the Internet 590. As will be appreciated by those of ordinary skill in the art, the network may be embodied using conventional networking technologies and may include one or more of the following: local area networks, wide area networks, intranets, public Internet 590 and the like. As previously stated, the Fusion Center 550, the Application Layer 120, and the Data Collecting Layer 160 may all be embodied in one physical device, or reside in separate devices that operatively coupled through a medium such as the Internet 590 or a local area network.

In general, the routines which are executed when implementing embodiments of the invention, whether implemented as part of an operating system or a specific application, component, program, object, module or sequence of instructions, will be referred to herein as computer programs, or simply programs. The computer programs typically include one or more instructions that are resident at various times in various memory and storage devices in an information processing or handling system such as a computer, and that, when read and executed by one or more processors, cause that system to perform the steps necessary to execute steps or elements embodying the various aspects of the invention.

Throughout the description herein, an embodiment of the invention is illustrated with aspects of the invention embodied solely on computer system 550. As will be appreciated by those of ordinary skill in the art, aspects of the invention may be distributed amongst one or more networked computing devices which interact with computer system 550 via one or more data networks such as, for example, network 590. However, for ease of understanding, aspects of the invention have been embodied in a single computing device—computer system 550.

Computer system 550 includes processing sub-system 502 which communicates with various input devices, output devices and network 590. Additionally, combination input/output (I/O) devices may also be in communication with processing sub-system 502. Examples of conventional I/O devices include removable and fixed recordable media 510 (e.g., floppy disk drives, tape drives, CD-ROM drives, DVD-RW drives, etc.), touch screen displays and the like.

Exemplary processing system 550 includes several components—central processing unit (CPU device) 502, memory 504, network interface (I/F) 508 and I/O I/F 506. Each component is in communication with the other components via a suitable communications bus 512 as required. CPU 502 is suitable for the operations described herein. As will be appreciated by those of ordinary skill in the art, other embodiments of processing system 550 could use alternative CPUs and may include embodiments in which one or more CPUs are employed. CPU 502 may include various support circuits to enable communication between itself and the other components of processing system 550.

Memory 504 includes both volatile and persistent memory for the storage of: operational instructions for execution by CPU 502, data registers, application storage and the like. Memory 504 preferably includes a combination of random access memory (RAM), read only memory (ROM) and persistent memory such as that provided by a hard disk drive.

Network interface 508 enables communication between computer system 550 and other network computing devices (not shown) via network 590. Network interface 508 may be embodied in one or more conventional communication devices. Examples of a conventional communication device include an Ethernet card, a token ring card, a modem or the like. Network interface 508 may also enable the retrieval or transmission of instructions for execution by CPU 502 from or to a remote storage media or device via network 590.

Although removable media 510 is illustrated as a conventional CD-ROM, other removable memory devices such as Zip® drives, flash cards, static memory devices and the like may also be employed. Removable media 510 may be used to provide instructions for execution by CPU 502 or as a removable data storage device. The computer instructions/applications stored in memory 504 and executed by CPU 502 (thus adapting the operation of computer system 550 as described herein) are illustrated in functional block form in FIG. 5. As will be appreciated by those of ordinary skill in the art, the delineation between aspects of the applications illustrated as functional blocks in FIG. 5 is somewhat arbitrary as the various operations attributed to a particular application as described herein may, in alternative embodiments, be subsumed by another application.

What has been shown and discussed is a highly-simplified depiction of a programmable computer apparatus. Those skilled in the art will appreciate that a variety of alternatives are possible for the individual elements, and their arrangement, described above, while still falling within the scope of the invention. Thus, while it is important to note that the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of signal bearing media include ROMs, DVD-ROMs, and transmission-type media, such as digital and analog communication links, wired or wireless communications links using transmission forms, such as, for example, radio frequency and light wave transmissions. The signal bearing media make take the form of coded formats that are decoded for use in a particular data processing system.

According to another embodiment of the invention, a computer readable medium, such as a CDROM 510 can include program instructions for operating the programmable computer 550 according to the invention. What has been shown and discussed is a highly-simplified depiction of a programmable computer apparatus. Those skilled in the art will appreciate that other low-level components and connections are required in any practical application of a computer apparatus.

Therefore, while there has been described what is presently considered to be the preferred embodiment, it will understood by those skilled in the art that other modifications can be made within the spirit of the invention. The above descriptions of embodiments are not intended to be exhaustive or limiting in scope. The embodiments, as described, were chosen in order to explain the principles of the invention, show its practical application, and enable those with ordinary skill in the art to understand how to make and use the invention. It should be understood that the invention is not limited to the embodiments described above, but rather should be interpreted within the full meaning and scope of the appended claims.

We claim:

1. A method comprising steps of:
   using a centralized information fusing device as part of a distributed computing system, performing:
      receiving from an application layer a target range for a level of reporting quality for processed data;
      setting data collection parameters to meet the target range;
      setting an acceptable threshold value within which the level of reporting quality may deviate from the target range;
      collecting data from a plurality of remote data collecting devices deployed in the distributed computing system according to the data collection parameters, a portion of said data being compromised during the collecting process;
      processing the collected data to produce the processed data;
      evaluating the processed data based on observable metrics of current collected data and reported data losses;
      forecasting an expected reporting quality that the data will possess if the fusion device continues collecting data under present data collection parameters, while continuing to collect data;
      comparing the expected reporting quality with the target range; and
      reporting the processed data when the expected reporting quality falls within the target range for the level of reporting quality.

2. The method of claim 1 further comprising a step of:
   dynamically adjusting the data collection parameters when the expected reporting quality falls below the target range.

3. The method of claim 1 further comprising a step of:
   dynamically adjusting the processing of the collected data when the estimated reporting quality falls below the target range.

4. The method of claim 2 wherein dynamically adjusting the data collection parameters comprises at least one action selected from a group consisting of:
   adjusting a timeframe for data collection, adjusting a rate of the data collection, adjusting a precision of the data collection, and shifting to a different data collecting process.

5. The method of claim 3 wherein adjusting the processing comprises at least one operation selected from a set of operations consisting of:
   adjusting a size of a cluster of the remote data collecting devices for which data is aggregated, adjusting a granularity of the data by which information is aggregated, and shifting to a different aggregation operator.

6. The method of claim 2 wherein dynamically adjusting the data collection takes into account cost constraints in adjusting the data collection and aggregation parameters.

7. The method of claim 6 wherein the adjusting step takes into account the cost constraint selected from a group consisting of:
   a cost of communicating adjusted parameters to the remote information collecting devices, a cost of applying the adjustment at the remote information collecting devices, and a cost of reverting back to original parameters at a completion of an observation period.

8. The method of claim 6 wherein applying the adjustment comprises modifying settings of the remote information collecting devices and the cost constraint comprises costs incurred under the modified settings due to the adjustment.

9. The method of claim 2 wherein the adjusting can be performed offline in a simulation environment before said adjusting is applied to the information fusing device.

10. The method of claim 1 wherein the evaluating step comprises setting a timeframe for observing the metrics of the current collected data and any realized data losses.

11. The method of claim 1 wherein the forecasting step comprises: generating a statistical model of the collected data.

12. A distributed computing system for remote adaptive decision making, the system comprising:
    a plurality of remote data collecting devices; and
    a fusion device operatively coupled with at least some of the plurality of the remote data collecting devices, said fusion device executing steps of:
       receiving from an application layer a target range for a level of reporting quality for processed data;
       setting data collection parameters to meet the target range;
       setting an acceptable threshold value within which the level of reporting quality may deviate from the target range;
       collecting data from the plurality of remote data collecting devices deployed in the distributed computing system according to the data collection parameters, a portion of said data being compromised during the collecting process;
       processing the collected data to produce the processed data;
       evaluating the processed data based on observable metrics of current collected data and reported data losses;
       forecasting an expected reporting quality that the data will possess if the fusion device continues collecting data under present data collection parameters, while continuing to collect data;
       comparing the expected reporting quality with the target range; and
       reporting the processed data when the expected reporting quality falls within the target range for the level of reporting quality.

13. The distributed computing system of claim 12 wherein the data is categorized into multiple classes, wherein each class has a different target range.

14. The distributed computing system of claim 13 wherein each class uses different data collecting devices and processes.

15. The distributed computing system of claim 14 wherein the remote data collecting devices are grouped in clusters.

16. The distributed computing system of claim 12 wherein the fusion device is further configured for:
    dynamically adjusting the data collection parameters when the estimated expected reporting quality falls below the target range.

17. The distributed computing system of claim 12 wherein the fusion device is further configured for:
    dynamically adjusting the processing of the collected data when the estimated reporting quality falls below the target range.

18. The distributed computing system of claim 12 further comprising the application layer.

19. A non-transitory computer readable storage medium comprising program code that, when executed, enables a computing device to perform as a fusion device as part of a distributed computing system, performing steps of:
    receive from an application layer a target range for a level of reporting quality for processed data;
    set data collection parameters to meet the target range;
    set an acceptable threshold value within which the level of reporting quality may deviate from the target range;

collect the data from a plurality of remote data collecting devices deployed in the distributed computing system according to the data collection parameters, a portion of said data being compromised during the collecting process;

process the collected data to produce the processed data;

evaluate the processed data based on observable metrics of current collected data and reported data losses;

forecast an expected reporting quality that the data will possess if the fusion device continues collecting data under present data collection parameters, while continuing to collect data;

compare the expected reporting quality with the target range; and report the processed data when the expected reporting quality falls within the target range for the level of reporting quality.

* * * * *